United States Patent
Gross et al.

(10) Patent No.: US 6,957,365 B2
(45) Date of Patent: Oct. 18, 2005

(54) METHOD AND APPARATUS FOR USING ACOUSTIC SIGNALS TO IDENTIFY DISK DRIVES THAT ARE LIKELY TO FAIL

(75) Inventors: Kenny C. Gross, San Diego, CA (US); Wendy Lu, La Jolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 559 days.

(21) Appl. No.: 10/222,611

(22) Filed: Aug. 16, 2002

(65) Prior Publication Data

US 2004/0034818 A1 Feb. 19, 2004

(51) Int. Cl.$^7$ ................................................ G06F 11/00
(52) U.S. Cl. ............................. 714/25; 714/42; 714/48
(58) Field of Search ............................... 714/25, 42, 48

(56) References Cited

U.S. PATENT DOCUMENTS

| | | | | |
|---|---|---|---|---|
| 4,425,798 A | * | 1/1984 | Nagai et al. | 73/659 |
| 4,988,979 A | * | 1/1991 | Sasaki et al. | 340/683 |
| 5,734,579 A | * | 3/1998 | Sakaguchi | 702/78 |
| 5,854,828 A | * | 12/1998 | Kocis et al. | 379/93.31 |
| 6,782,324 B2 | * | 8/2004 | Gross et al. | 702/34 |

OTHER PUBLICATIONS

Kang et al., "Noise Source Identification of Hard Disk Drive Using Sound Intensity and Its Control", Asian–Pacific Magnetic Recording Conference, Nov. 6–8, 2000, pp.:MP7/1–MP7/2.*

Fah et al., "Vibro–acoustic analysis of hard disk drives", Magnetic Recording Conference, Aug. 27–29, 2002, Page(s):TU–P–19–01–TU–P–19–02.*

* cited by examiner

*Primary Examiner*—Robert Beausoliel
*Assistant Examiner*—Michael Maskulinski
(74) *Attorney, Agent, or Firm*—Park, Vaughan & Fleming, LLP; Edward J. Grundler

(57) ABSTRACT

One embodiment of the present invention provides a system that facilitates determining whether a disk drive is likely to fail. The system monitors a first acoustic signal emitted from the disk drive during operation of the disk drive. Next, the system compares characteristics of the first acoustic signal against characteristics of a first baseline acoustic signal that reflects normal operation of the disk drive. If the first acoustic signal differs by a predetermined amount from the first baseline acoustic signal, the system indicates that the disk drive is likely to fail.

18 Claims, 4 Drawing Sheets

METHOD AND APPARATUS FOR USING ACOUSTIC SIGNALS TO IDENTIFY DISK DRIVES THAT ARE LIKELY TO FAIL

BACKGROUND

1. Field of the Invention

The present invention relates to systems for providing fault-tolerance for disk drives in computer systems. More specifically, the present invention relates to a method and an apparatus for using acoustic signals to identify disk drives that are likely to fail in a computer system.

2. Related Art

As computer systems grow increasingly more powerful, they are able to manipulate larger volumes of data and are able to execute larger and more sophisticated computer programs. In order to accommodate these larger volumes of data and larger programs, computer systems are using larger amounts of disk storage. For example, some existing server systems currently support more than 15,000 disk drives.

Ensuring the reliability of disk storage in these systems is critically important for most applications. Allowing data to be corrupted or lost can have a devastating effect on businesses that rely on the data. For example, airlines rely on the integrity of data stored in their reservation systems for most of their day-to-day operations, and would essentially cease to function if this data became lost or corrupted.

About one percent of disk drives within a computer system fail each year. This has motivated system designers to develop techniques to mitigate the loss of data caused by disk drive failures. For example, disk drives are often organized into "RAID" arrays to ameliorate the effects of a drive failure by providing data redundancy.

Although these redundancy-based techniques can help prevent the loss of data, a failed disk drive must be replaced quickly to maintain system reliability. If a second disk drive fails before the first failed disk drive can be replaced, data can be lost.

Note that disk drives can fail in a number of ways. A failure in the electrical circuitry of a disk drive is typically instantaneous and catastrophic. On the other hand, more common mechanical failures often develop over an extended period of time. For example, one of the most common disk drive failures is a failure of a spindle bearing. Spindle bearing failures typically take place over an extended period of time as frictional forces gradually wear away at the spindle bearing. In many cases, a spindle bearing can change from being fully functional to completely failed over several hours, or even days.

Some software solutions attempt to detect incipient failures by analyzing read/write errors and retry attempts. While this technique can be effective in some situations, a disk drive needs to be very close to failure before the software can detect the impending failure. This leaves very little time to replace the failing disk drive.

What is needed is a method and an apparatus for identifying disk drives that are likely to fail without the problems described above.

SUMMARY

One embodiment of the present invention provides a system that facilitates determining whether a disk drive is likely to fail. The system monitors a first acoustic signal emitted from the disk drive during operation of the disk drive. Next, the system compares characteristics of the first acoustic signal against characteristics of a first baseline acoustic signal that reflects normal operation of the disk drive. If the first acoustic signal differs by a predetermined amount from the first baseline acoustic signal, the system indicates that the disk drive is likely to fail.

In a variation of this embodiment, comparing characteristics of the first acoustic signal against characteristics of the first baseline acoustic signal involves calculating a first power spectral density from the first acoustic signal and then subtracting a first baseline power spectral density from the first power spectral density.

In a further variation, calculating the first power spectral density involves performing a fast Fourier transform on the first acoustic signal.

In a further variation, the disk drive includes a linear array of disk drives. In this variation, the system receives both a first acoustic signal and a second acoustic signal from acoustic sensors located at different positions relative to the linear array of disk drives. If the first acoustic signal and the second acoustic signal differ by a predetermined amount from the first baseline acoustic signal and a second baseline acoustic signal, the system correlates the first acoustic signal with the second acoustic signal to determine which disk drive in the linear array is likely to fail.

In a further variation, the disk drive includes a two-dimensional array of disk drives. In this variation, the system receives the first acoustic signal, a second acoustic signal and a third acoustic signal from acoustic sensors at non-collinear locations relative to the two-dimensional array of disk drives. If the first acoustic signal, the second acoustic signal, and the third acoustic signal differ by a predetermined amount from the first baseline acoustic signal, a second baseline acoustic signal, and a third baseline acoustic signal, the system correlates the first acoustic signal, the second acoustic signal, and the third acoustic signal to determine which disk drive in the two-dimensional array is likely to fail.

In a further variation, the system limits the frequency range of the first power spectral density, the second power spectral density, and the third power spectral density to a predetermined frequency range associated with failing disk drives.

In a further variation, the first acoustic signal, the second acoustic signal, and the third acoustic signal are obtained with a first microphone, a second microphone, and a third microphone, respectively.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System with a Single Disk Drive

Figure 1:
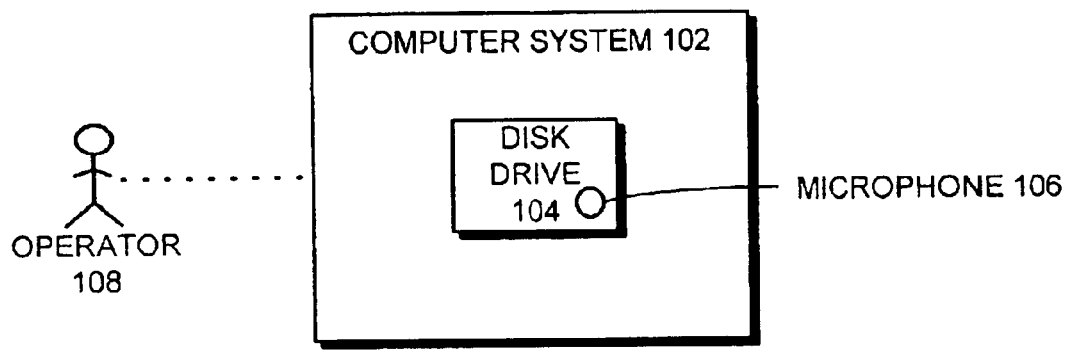
FIG. 1 illustrates a computer system with a single disk drive in accordance with an embodiment of the present invention.

FIG. 1 illustrates a computer system 102 with a single disk drive in accordance with an embodiment of the present invention. Computer system 102 can generally include any type of computer system, including, but not limited to, a computer system based on a microprocessor, a mainframe computer, a digital signal processor, a portable computing device, a personal organizer, a device controller, and a computational engine within an appliance.

Computer system 102 includes disk drive 104. Disk drive 104 can include any type of non-volatile storage device that can be coupled to a computer system. This includes, but is not limited to, magnetic, optical, and magneto-optical storage devices.

Microphone 106 is acoustically coupled to disk drive 104. In operation, microphone 106 monitors the sounds generated by disk drive 104. The signals representing these sounds are provided to a process within computer system 102 that computes the power spectral density spectrum (PSD) of the signals. This PSD is compared to a baseline PSD to determine if the sounds have changed since the baseline PSD was generated. If the PSD has changed significantly, which possibly indicates that failure of the disk drive is imminent, operator 108 is informed. This process is described in more detail in conjunction with FIG. 4 below.

Computer System with a Linear Array of Disk Drives

Figure 2:
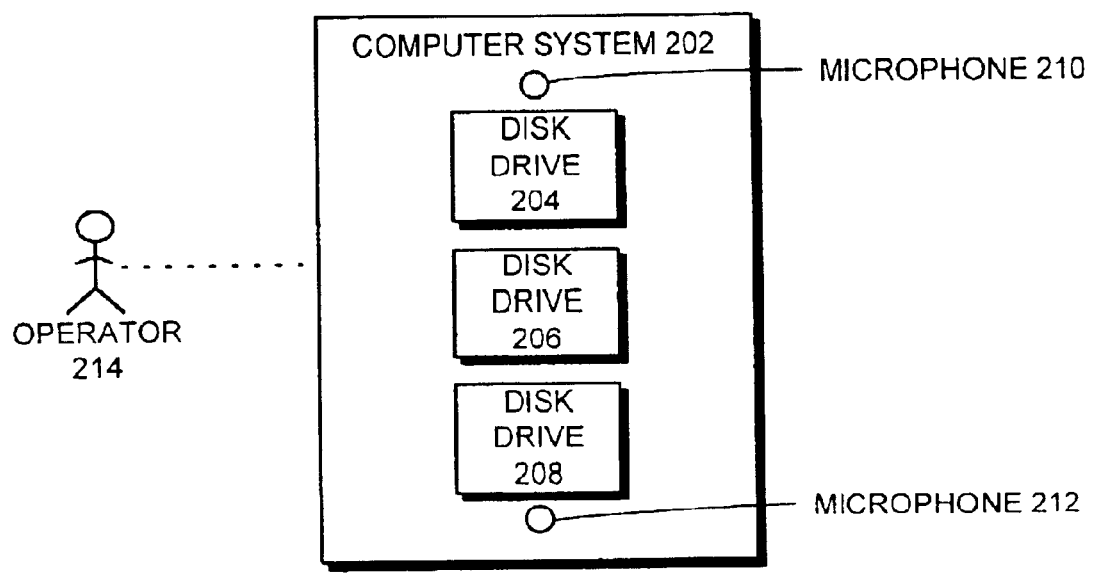
FIG. 2 illustrates a computer system with a linear array of disk drives in accordance with an embodiment of the present invention.

FIG. 2 illustrates a computer system 202 with a linear array of disk drives in accordance with an embodiment of the present invention. Computer system 202 can generally include any type of computer system, including, but not limited to, a computer system based on a microprocessor, a mainframe computer, a digital signal processor, a portable computing device, a personal organizer, a device controller, and a computational engine within an appliance.

Computer system 202 includes disk drives 204, 206, and 208 organized into a linear array. Disk drives 204, 206, and 208 can include any type of non-volatile storage devices that can be coupled to a computer system. This includes, but is not limited to, magnetic, optical, and magneto-optical storage devices. Note that this linear array can include more or fewer drives than is shown in FIG. 2.

Microphones 210 and 212 are acoustically coupled to the linear array of disk drives. Note that microphones 210 and 212 are positioned in different locations relative to the linear array of disk drives. During operation, microphones 210 and 212 monitor the sounds generated by the linear array of disk drives. The signals representing these sounds are provided to a process within computer system 202 that computes the power spectral density (PSD) of each of the signals. This PSD is compared to a baseline PSD for each microphone to determine if the sounds have changed since the baseline PSD was generated. If the PSDs have changed significantly, indicating that failure of a disk drive is likely, the system determines which disk drive is failing and informs operator 214. This process is described in more detail in conjunction with FIG. 4 below.

Server with Two-Dimensional Array of Disk Drives

Figure 3:
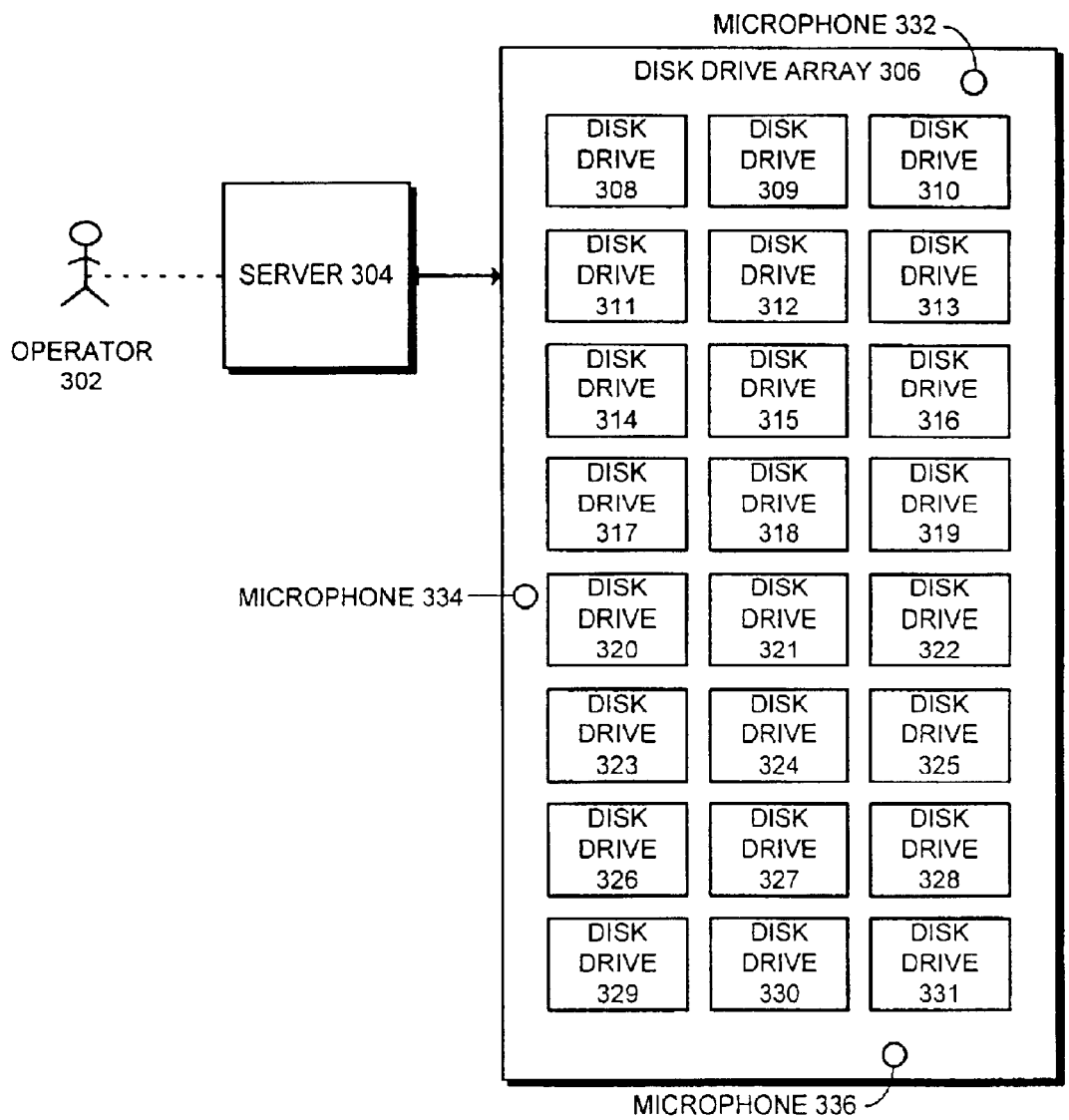
FIG. 3 illustrates a server with a two-dimensional array of disk drives in accordance with an embodiment of the present invention.

FIG. 3 illustrates a server 304 with a two-dimensional array of disk drives in accordance with an embodiment of the present invention. Server 304 can generally include any computational node including a mechanism for servicing requests from a client for computational and/or data storage resources. Server 304 is coupled to disk drive array 306.

Disk drive array 306 can be housed in an equipment cabinet, a rack, or the like. Disk drive array 306 includes a two-dimensional array of disk drives 308-331. Disk drives 308-331 can include any type of non-volatile storage devices that can be coupled to a computer system. This includes, but is not limited to, magnetic, optical, and magneto-optical storage devices. Note that disk drive array 306 can include more or fewer drives in the two-dimensional array than is shown in FIG. 3.

Microphones 332, 334, and 336 are acoustically coupled to the two-dimensional array of disk drives. Note that microphones 332, 334, and 336 are located in different, non-collinear locations relative to the two-dimensional array of disk drives. During operation, microphones 332, 334, and 336 monitor the sounds generated by the two-dimensional array of disk drives. The signals representing these sounds are provided to a process within the computer that computes the power spectral density (PSD) of each of the signals. This PSD is compared to a baseline PSD for each microphone to determine if the sounds have changed since the baseline PSD was generated. If the PSDs have changed significantly, indicating that failure of a disk drive is imminent, the system determines which disk drive is failing and informs operator 302. This process is described in more detail in conjunction with FIG. 4 below.

Computer System 402

Figure 4:
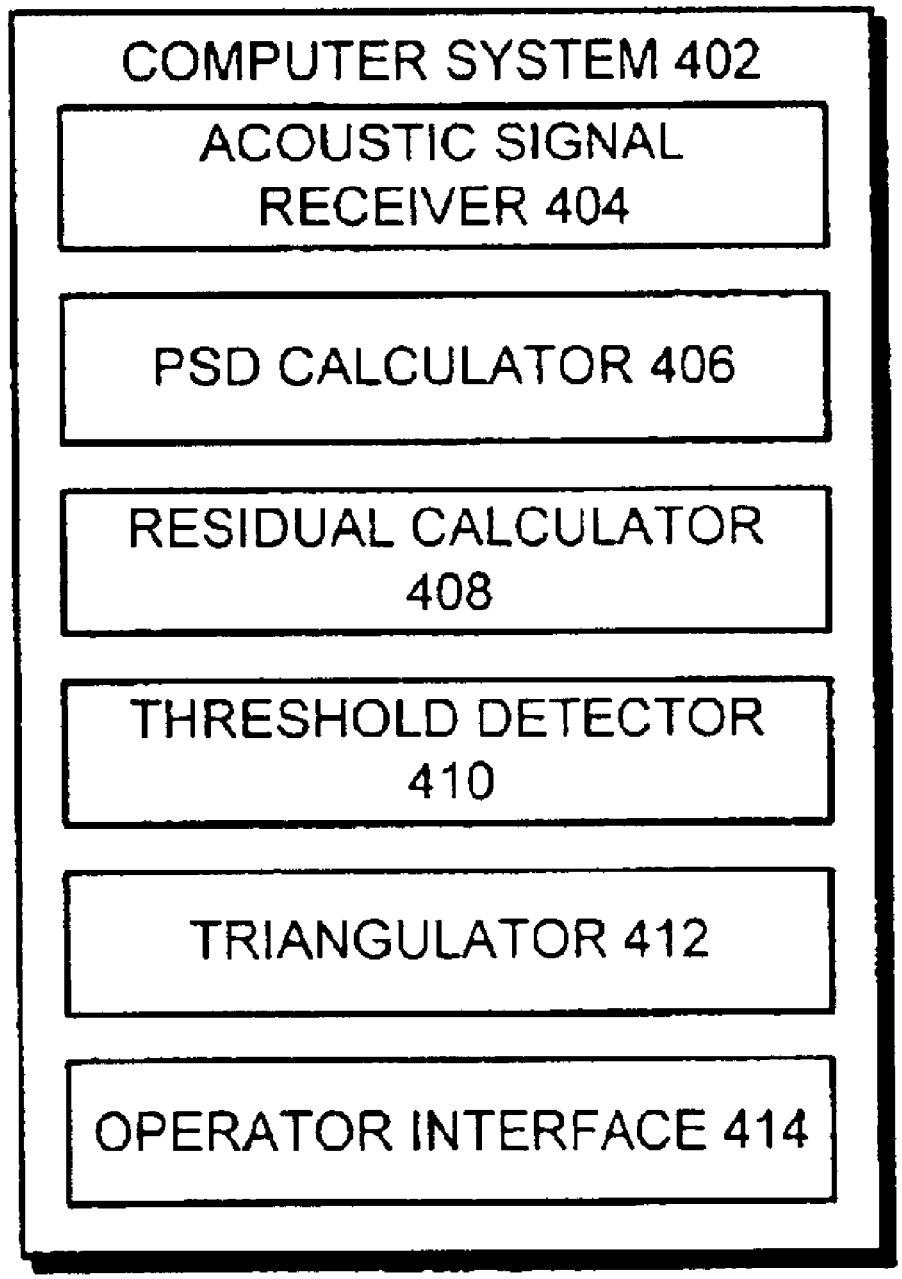
FIG. 4 illustrates a computer system in accordance with an embodiment of the present invention.

FIG. 4 illustrates computer system 402 in accordance with an embodiment of the present invention. Note that computer system 402 is representative of computer systems 102 and 202 and server 304 as described above. Computer system 402 contains a number of items, including acoustic signal receiver 404, PSD calculator 406, residual calculator 408, threshold detector 410, triangulator 412, and operator interface 414.

Acoustic signal receiver 404 receives signals from the microphone or microphones within the system. Acoustic signal receiver 404 converts the analog signals from the microphones into a digital format and can additionally include signal-conditioning mechanisms. Analog-to-digital sampling and conversion is well known in the art and will not be discussed further herein.

PSD calculator 406 calculates the power spectral density of the signals that were received by acoustic signal receiver 404. These calculations can include performing a fast Fourier transform (FFT) on each of the digitized microphone signals. Note that after the FFT has been performed, wavelengths of interest can be selected for processing. This selection process isolates wavelengths that are associated with disk drive failures. At the same time, it eliminates extraneous frequencies associated with sounds such as human voices and other sounds that are common in data centers. PSD calculator 406 can also provide a baseline PSD for each microphone by calculating a PSD for good disk drives operating in the system.

Residual calculator 408 calculates a residual for each microphone by subtracting the baseline PSD from the current PSD for each microphone. These residuals indicate the change in noise level from the baseline PSD and can be an early indicator of impending disk drive failure.

Threshold detector 410 compares the residuals against an established threshold to determine whether a disk drive is failing. Note that the established threshold can include amplitude levels and times. For example, exceeding the threshold by one percent for five seconds may not be critical, but exceeding the threshold by fifty percent for one second or exceeding the threshold by 10 percent for an hour might be critical.

Triangulator 412 determines which disk drive is failing in systems with multiple disk drives. Triangulator 412 can use any known triangulation mechanism, possibly coupled with fuzzy logic, to identify the failing disk drive. Triangulation mechanisms are well-known in the art and will not be described further herein.

After determining which disk drive is failing, operator interface 414 notifies the operator that failure of the specific disk drive is likely. Note that notifying the operator can include notifying an administrator or a repair person, or storing the data in a log file for later retrieval.

Determining a Faulty Disk Drive

Figure 5:
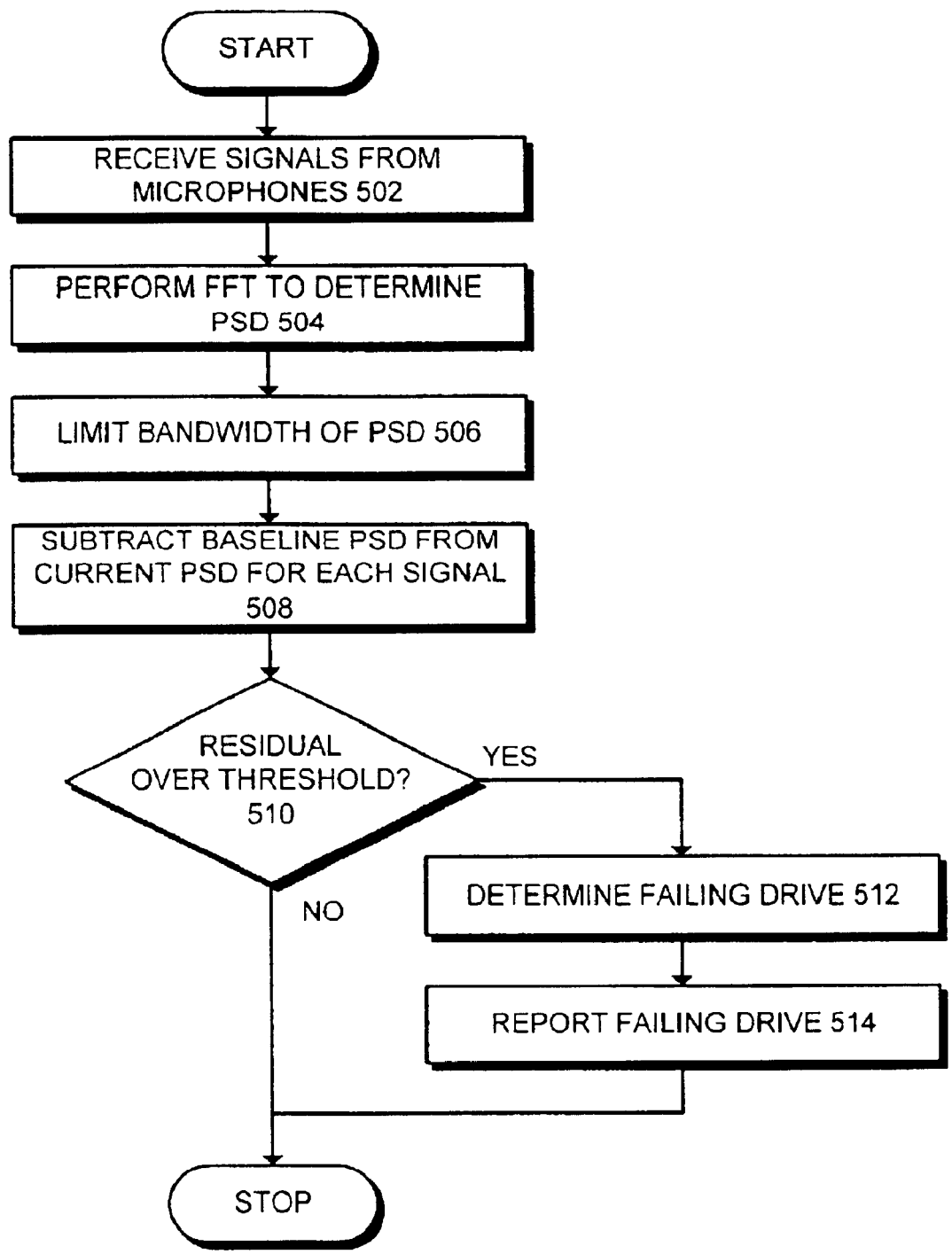
FIG. 5 is a flowchart illustrating the process of determining a faulty disk drive in accordance with an embodiment of the present invention.

FIG. 5 is a flowchart illustrating the process of determining a faulty disk drive in accordance with an embodiment of the present invention. The system starts when acoustic signal receiver 404 receives signals from the microphones that monitor the disk drives (step 502). Next, PSD calculator 406 performs an FFT on these signals to determine the PSD of the signals (step 504). PSD calculator 406 also isolates a specific bandwidth range within the PSD to allow only frequencies of interest to be examined (step 506).

Residual calculator 408 then subtracts the baseline PSD from the current PSD to determine the residual (step 508). Next, threshold detector determines if the residual is greater than an established threshold (step 510). If the residual is greater than the established threshold, triangulator 412 identifies the failing drive (step 512). Finally, operator interface 414 reports the failing drive (step 514).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining whether a disk drive is likely to fail, comprising:
   monitoring a first acoustic signal emitted from the disk drive during operation of the disk drive;
   comparing characteristics of the first acoustic signal against characteristics of a first baseline acoustic signal, wherein the first baseline acoustic signal reflects normal operation of the disk drive; and
   if the first acoustic signal differs by a predetermined amount from the first baseline acoustic signal, indicating that the disk drive is likely to fail;
   wherein the disk drive includes a linear array of disk drives;
   wherein receiving the first acoustic signal involves, receiving the first acoustic signal and a second acoustic signal from the linear array of disk drives;
   wherein the first acoustic signal and the second acoustic signal are gathered from acoustic sensors at different locations relative to the linear array of disk drives;
   wherein if the first acoustic signal and the second acoustic signal differ by the predetermined amount from the first baseline acoustic signal and a second baseline acoustic signal, the method further comprises,
      correlating the first acoustic signal with the second acoustic signal to determine which disk drive in the linear array is likely to fail, and
   indicating that the disk drive is likely to fail.

2. The method of claim 1, wherein comparing characteristics of the first acoustic signal against characteristics of the first baseline acoustic signal involves:
   calculating a first power spectral density from the first acoustic signal; and
   subtracting a first baseline power spectral density from the first power spectral density.

3. The method of claim 2, wherein calculating the first power spectral density involves performing a fast Fourier transform on the first acoustic signal.

4. The method of claim 1,
   wherein the disk drive includes a two-dimensional array of disk drives;
   wherein receiving the first acoustic signal involves, receiving the first acoustic signal, the second acoustic signal and a third acoustic signal from the two-dimensional array of disk drives;
   wherein the first acoustic signal, the second acoustic signal, and the third acoustic signal are gathered from acoustic sensors at non-collinear locations relative to the two-dimensional array of disk drives;
   wherein if the first acoustic signal, the second acoustic signal, and the third acoustic signal differ by the predetermined amount from the first baseline acoustic signal, the second baseline acoustic signal, and a third baseline acoustic signal, the method further comprises,
      correlating the first acoustic signal, the second acoustic signal, and the third acoustic signal to determine which disk drive in the two-dimensional array is likely to fail, and
   indicating that the disk drive is likely to fail.

5. The method of claim 4, further comprising limiting a frequency range of a first power spectral density, a second power spectral density, and a third power spectral density to a predetermined frequency range associated with failing disk drives.

6. The method of claim 4, wherein the first acoustic signal, the second acoustic signal, and the third acoustic signal are obtained with a first microphone, a second microphone, and a third microphone respectively.

7. A computer-readable storage device storing instructions that when executed by a computer cause the computer to perform a method for determining whether a disk drive is likely to fail, the method comprising:
   monitoring a first acoustic signal emitted from the disk drive during operation of the disk drive;
   comparing characteristics of the first acoustic signal against characteristics of a first baseline acoustic signal, wherein the first baseline acoustic signal reflects normal operation of the disk drive; and
   if the first acoustic signal differs by a predetermined amount from the first baseline acoustic signal, indicating that the disk drive is likely to fail;

wherein the disk drive includes a linear array of disk drives;
wherein receiving the first acoustic signal involves, receiving the first acoustic signal and a second acoustic signal from the linear array of disk drives;
wherein the first acoustic signal and the second acoustic signal are gathered from acoustic sensors at different locations relative to the linear array of disk drives;
wherein if the first acoustic signal and the second acoustic signal differ by the predetermined amount from the first baseline acoustic signal and a second baseline acoustic signal, the method further comprises,
correlating the first acoustic signal with the second acoustic signal to determine which disk drive in the linear array is likely to fail, and
indicating that the disk drive is likely to fail.

8. The computer-readable storage device of claim 7, wherein comparing characteristics of the first acoustic signal against characteristics of the first baseline acoustic signal involves:
calculating a first power spectral density from the first acoustic signal; and
subtracting a first baseline power spectral density from the first power spectral density.

9. The computer-readable storage device of claim 8, wherein calculating the first power spectral density involves performing a fast Fourier transform on the first acoustic signal.

10. The computer-readable storage device of claim 7,
wherein the disk drive includes a two-dimensional array of disk drives;
wherein receiving the first acoustic signal involves, receiving the first acoustic signal, the second acoustic signal and a third acoustic signal from the two-dimensional array of disk drives;
wherein the first acoustic signal, the second acoustic signal, and the third acoustic signal are gathered from acoustic sensors at non-collinear locations relative to the two-dimensional array of disk drives;
wherein if the first acoustic signal, the second acoustic signal, and the third acoustic signal differ by the predetermined amount from the first baseline acoustic signal, the second baseline acoustic signal, and a third baseline acoustic signal, the method further comprises,
correlating the first acoustic signal, the second acoustic signal, and the third acoustic signal to determine which disk drive in the two-dimensional array is likely to fail, and
indicating that the disk drive is likely to fail.

11. The computer-readable storage device of claim 10, the method further comprising limiting a frequency range of a first power spectral density, a second power spectral density, and a third power spectral density to a predetermined frequency range associated with failing disk drives.

12. The computer-readable storage device of claim 10, wherein the first acoustic signal, the second acoustic signal, and the third acoustic signal are obtained with a first microphone, a second microphone, and a third microphone respectively.

13. An apparatus for determining whether a disk drive is likely to fail, comprising:
a monitoring mechanism that is configured to monitor a first acoustic signal emitted from the disk drive during operation of the disk drive;
a comparing mechanism that is configured to compare characteristics of the first acoustic signal against characteristics of a first baseline acoustic signal, wherein the first baseline acoustic signal reflects normal operation of the disk drive; and
an indicating mechanism that is configured to indicate that the disk drive is likely to fail;
wherein the disk drive includes a linear array of disk drives;
wherein receiving the first acoustic signal involves, receiving the first acoustic signal and a second acoustic signal from the linear array of disk drives;
wherein the first acoustic signal and the second acoustic signal are gathered from acoustic sensors at different locations relative to the linear array of disk drives;
a correlating mechanism that is configured to correlate the first acoustic signal with the second acoustic signal to determine which disk drive in the linear array is likely to fail if the first acoustic signal and the second acoustic signal differ by a predetermined amount from the first baseline acoustic signal and a second baseline acoustic signal.

14. The apparatus of claim 13, further comprising:
a calculating mechanism that is configured to calculate a first power spectral density from the first acoustic signal; and
a subtracting mechanism that is configured to subtract a first baseline power spectral density from the first power spectral density.

15. The apparatus of claim 14, wherein the calculating mechanism is further configured to calculate the first power spectral density by performing a fast Fourier transform on the first acoustic signal.

16. The apparatus of claim 13,
wherein the disk drive includes a two-dimensional array of disk drives;
wherein receiving the first acoustic signal involves receiving the first acoustic signal, the second acoustic signal and a third acoustic signal from the two-dimensional array of disk drives;
wherein the first acoustic signal, the second acoustic signal, and the third acoustic signal are gathered from acoustic sensors at non-collinear locations relative to the two-dimensional array of disk drives;
wherein if the first acoustic signal, the second acoustic signal, and the third acoustic signal differ by the predetermined amount from the first baseline acoustic signal, the second baseline acoustic signal, and a third baseline acoustic signal, respectively, the correlating mechanism is further configured to correlate the first acoustic signal, the second acoustic signal, and the third acoustic signal to determine which disk drive in the two-dimensional array is likely to fail.

17. The apparatus of claim 16, further comprising a limiting mechanism that is configured to limit a frequency range of a first power spectral density, a second power spectral density, and a third power spectral density to a predetermined frequency range associated with failing disk drives.

18. The apparatus of claim 16, wherein the first acoustic signal, the second acoustic signal, and the third acoustic signal are obtained with a first microphone, a second microphone, and a third microphone respectively.

* * * * *